United States Patent [19]

Mashburn et al.

[11] Patent Number: 4,788,962
[45] Date of Patent: Dec. 6, 1988

[54] CANTILEVERED GAS BARBECUE

[76] Inventors: James S. Mashburn; Jerry P. Mashburn, both of 1201 E. Hill St., Long Beach, Calif. 90806

[21] Appl. No.: 104,294

[22] Filed: Oct. 5, 1987

[51] Int. Cl.⁴ .............................................. A47J 37/00
[52] U.S. Cl. ............................... 126/25 R; 126/41 R; 248/230
[58] Field of Search ................. 126/41 R, 41 A, 25 R, 126/2, 9 R, 9 B, 26, 29, 38, 39 M; 248/158, 230; 99/446, 450; 431/350

[56] References Cited

U.S. PATENT DOCUMENTS 3,524,980  8/1970  Meloan ............................ 126/41 R
3,785,361  1/1974  Mejyr et al. ..................... 126/41 R Primary Examiner—Samuel Scott
Assistant Examiner—Noah Kamen
Attorney, Agent, or Firm—Roger A. Marrs

[57] ABSTRACT

A barbecue apparatus is disclosed herein having its components coaxially disposed on a flanged base supported from a cantilevered arm anchored to a support tube or the like. The components include a circular walled bowl carried on the base with vent apertures in the bottom and a grease catch screen that is carried by an apertured liner supporting a gas burner. The reinforced mid-section of the grease screen is detachably coupled to the burner and a grill is removably carried about the peripheral edge marginal region of the liner. A vented lid includes a retention member engaged with the edge of the bowl for wind shielding purposes when not used as a cover for the bowl. A detachable coupler joins the burner to a gas supply cantilevered outwardly from the base which includes controls for gas distribution to the burner.

1 Claim, 3 Drawing Sheets

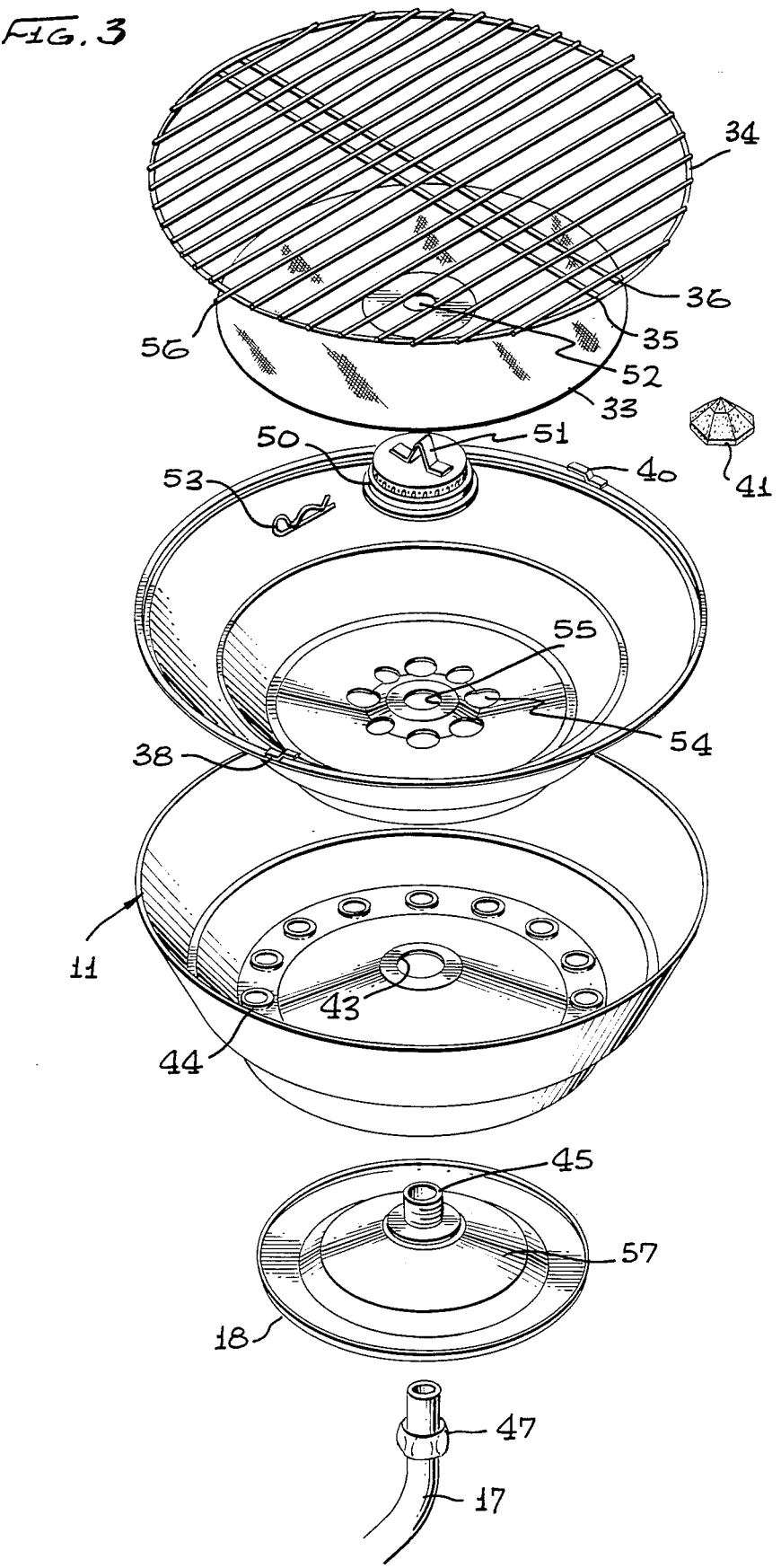

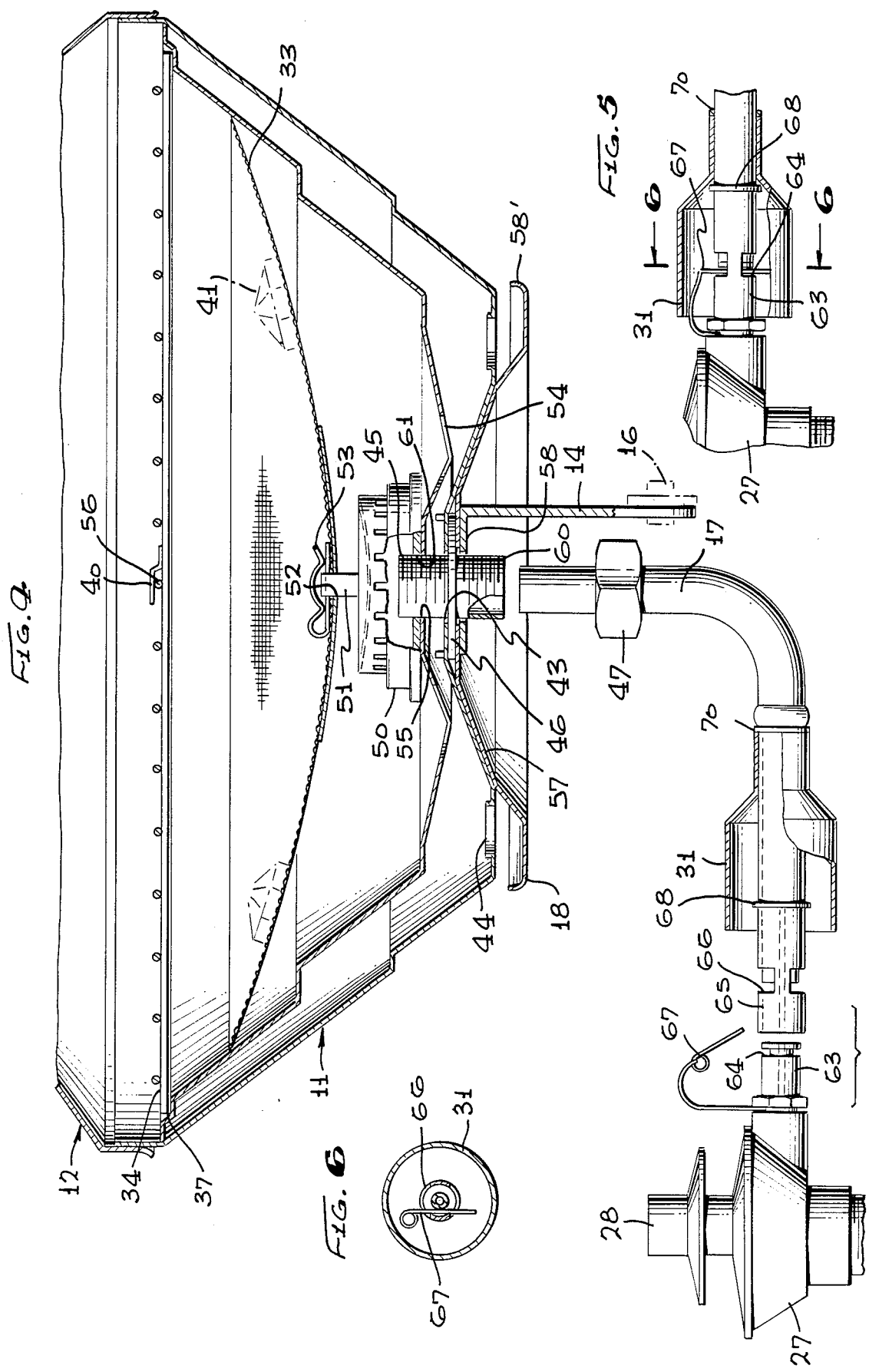

CANTILEVERED GAS BARBECUE

BACKGROUND OF THE INVENTION

1. Field of the Invention

The present invention relates to barbecue apparatus and, more particularly, to a novel outdoor cooking apparatus that is adapted to use gas as a fuel and which includes a novel mounting for its component parts so that the apparatus may be supported in a cantilevered position from an upright or horizontal support.

2. Brief Description of the Prior Art

In the past, it has been the conventional practice to employ an outdoor cooking apparatus which includes a bowl for holding a plurality of coals or briquettes as fuel so that when lit and burned, heat will rise for cooking a variety of food products on an overhead grill. Problems and difficulties have been encountered when employed with conventional apparatus which stem largely from the fact that the bowl for holding the coal or briquette fuel is susceptible to tilting or tipping which constitutes a dangerous apparatus. Also, most barbecue cooking apparatus are supported on an under frame which is vertically disposed having the fire bowl for the apparatus on top. Such a mounting is not always possible and in instances such as for use in the cockpit of a sailboat or power boat, conventional supports are limited and inadequate.

Some attempts have been made to remedy these problems by employing cantilevered supports which outwardly dispose the fire bowl from the cockpit of the boat. Although such conventional supports do hold the fire bowl outwardly, the mechanisms and construction of the apparatus is complex and cumbersome. Also, the problems attendant with lighted coals or briquettes are still present which is a dangerous proposition for use on the open water. In most instances, when coals or briquettes are used, ancillary accessories such as charcoal or lighter fluid are used which further increase the danger of inadvertent fire and spillage In many instances, persons using such briquettes or coals prefer to cook utilizing gas as a fuel so that lighter fluid is not required and open ignited coals are not present.

Although various types of stoves and cooking apparatus have used gas as a fuel supply, it is difficult to employ such a supply where the fire bowl is outwardly cantilevered from the supporting structure such as the stanchion or handrail on a boat Difficulties encountered when using gas as a fuel for barbecues stem largely from the fact that the barbecue is used in an outdoor environment subject to varying wind conditions. When strong gusts of wind occur, it is difficult to ignite the gas fumes whether an automatic igniter is used or a manually placed flame. Also, after the gas burner has been ignited, it is difficult to maintain in a lit condition when subjected to wind gusts.

Therefore, a long-standing need has existed to provide a novel barbecue apparatus for outdoor use which not only can be readily cantilevered outwardly from a supporting structure but includes the support and mounting of a gas containing vessel including means for protecting the burner from inadvertent wind gusts. Also, baffles and supporting means are required which will not interfere with the cooking procedure which may require adjustable venting or the like.

SUMMARY OF THE INVENTION

Accordingly, the above problems and difficulties are obviated by the present invention which provides a novel cooking apparatus of the barbecue type which includes a base having upper and lower threaded tubes for supporting the fire bowl and a cantilevered support respectively. The fire bowl includes a liner as well as a grease screen and the employment of a gas burner coupled to the free end of the upper post ties the components together The lower post of the base couples with the free end of a support arm having its opposite end detachably connected to a support rail or rod and a gas container including controls therefor is detachably connected to the extreme end of the lower post so that the supply of gas is selectively available to the gas burner within the fire bowl Venting apertures are suitably placed in the liner and the fire bowl and a wind deflector serving as a baffle is carried by the base immediately adjacent to the fire bowl for restricting the effects of ambient wind gusts. Additionally, means are provided on a lid normally covering the fire bowl for erecting the lid in an upright position along the edge of the fire bowl to serve as a wind deflector.

Therefore, it is among the primary objects of the present invention to provide a novel cooking apparatus of the barbecue type utilizing a gas fuel supply and incorporating baffle means for deflecting wind gusts from interfering with the ignition of the gas burner.

Another object of the present invention is to provide a novel cooking apparatus of the barbecue type which may be cantilevered outwardly from a supporting railing and which includes a self-contained gas supply selectively coupled to an operational gas burner within a fire bowl.

Yet another object of the present invention is to provide a novel cantilevered barbecue apparatus which includes a plurality of component parts coaxially disposed with respect to a supporting base so that the apparatus is a self-contained cooking unit outwardly supported from a rod or railing.

Still another object of the present invention is to provide a novel barbecue apparatus having a self-contained gas fuel storage unit which is detachably connected to a gas burner carried on a novel support base and which includes wind baffles for protecting the burner from adverse wind gusts during gas ignition.

Still a further object of the present invention is to provide a novel barbecue apparatus having a self-contained gas fuel supply which includes a novel mounting means for coaxially anchoring a component to a central cantilevered arm for outward support with respect to a railing, stanchion, or other fixed tubing and which further includes wind baffles for protecting the gas burner from inadvertent wind gusts.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 3 is an enlarged exploded perspective view illustrating the component parts of the apparatus;

FIG. 4 is a transverse cross-sectional view of the barbecue cooking apparatus incorporating the present invention shown in the previous figures;

FIG. 5 is a fragmentary sectional view of the detachable connection means coupling with the gas fuel supply to the fire bowl;

FIG. 6 is a cross-sectional view of the disconnect means shown in FIG. 5 as taken in the direction of arrow 6—6 thereof.

DESCRIPTION OF THE PREFERRED EMBODIMENT

Figure 1:
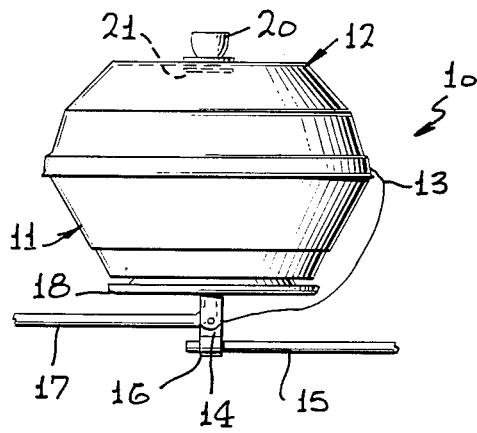
FIG. 1 is a side elevational view of the novel cooking apparatus of the present invention illustrating a lid placed over the fire bowl of the apparatus.
Figure 7:
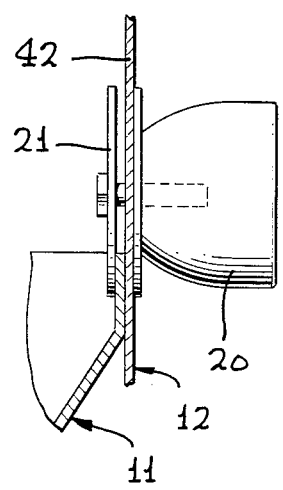
FIG. 7 is an enlarged sectional view of the cover and fire bowl edge shown in FIG. 2 and taken in the direction of arrow 7—7 thereof.

Referring in detail to FIG. 1, the novel barbecue cooking apparatus of the present invention is illustrated in the general direction of arrow 10 which includes a fire bowl 11 on which a lid 12 is disposed so as to act as a cover either during the cooking procedure or when the device is not in use. The lid is detachably connected to the upper edge marginal region of the fire bowl 11 and a tether cord 13 movably couples the lid 12 to the apparatus such as at a support brace 14. Therefore, the lid may be released from the fire bowl 11 but cannot be separated therefrom due to the connection by the tethering cord. The apparatus 10 is outwardly cantilevered from a supporting structure by a rod 15. One end of the rod may be attached to a support while its free end carries a fitting 16 which is coupled to the brace 14 by means of a nut and bolt fastener. Also, it is noted that a pipe 17 outwardly radiates from the support brace 14 and includes a band which enters the apparatus at its center. The opposite end of the tube 17 is connected to a gas supply as will be described later.

It is to be noticed that immediately adjacent to the bottom of the fire bowl 11, there is provided a baffle 18 which serves as a wind deflector to prevent gusts of wind from entering the fire bowl from any vent openings. Furthermore, the lid 12 includes a knob 20 and a pair of flanges separated by the thickness of the tub of the lid 12. However, a flange 21 of the pair is spaced from the underside of the lid a sufficient amount to accommodate the thickness of the edge marginal region of the fire bowl. In this manner, the lid may be used as a wind deflector when not covering the entire fire bowl.

Figure 2:
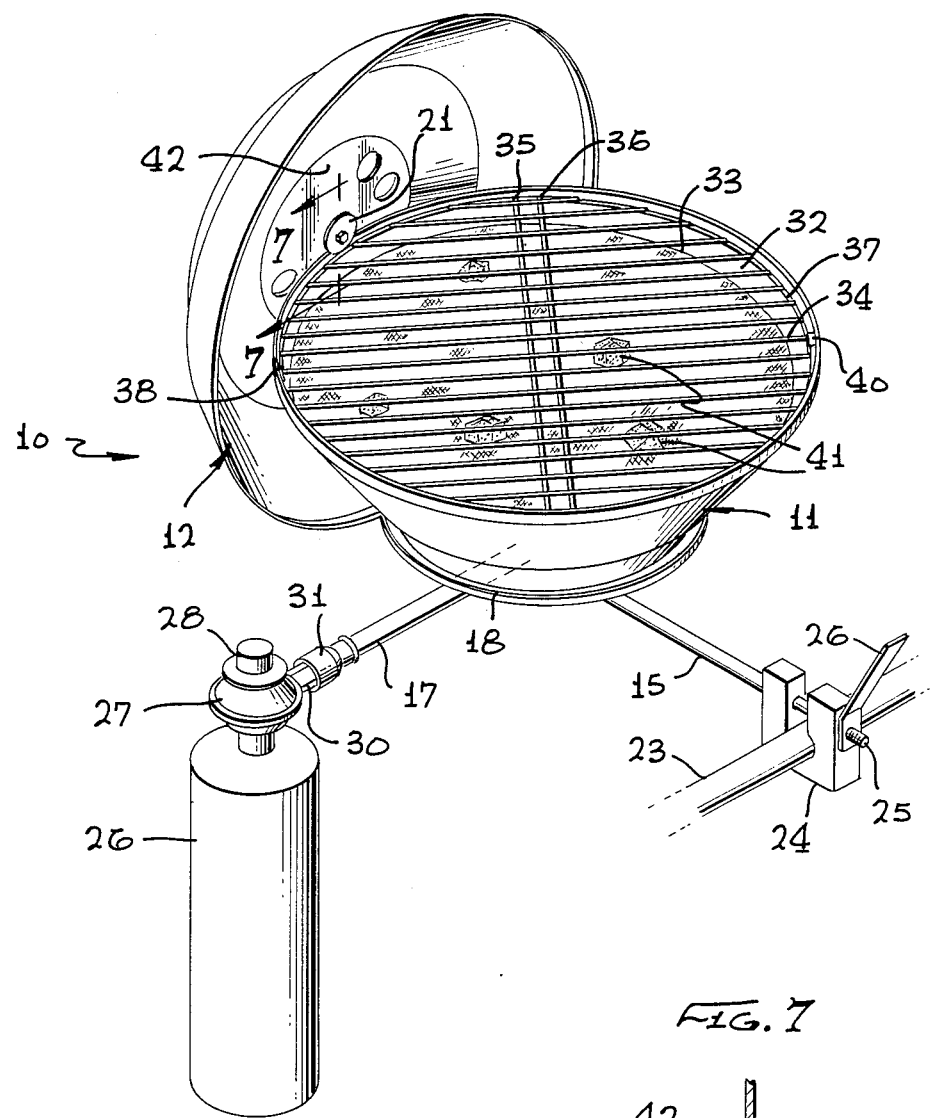
FIG. 2 is a front perspective view of the cooking apparatus of the present invention illustrating the lid in position as a wind deflector and further illustrating a self-contained gas fuel supply.

Referring now in detail to FIG. 2, it can be seen that the apparatus 10 is outwardly cantilevered from a support rod or tube 23 which may, for example, be the aft or stern stanchion on a power or sailboat. A coupling 24 of a C-shaped configuration serves to connect the rod 15 to the tube or rod 23. The extreme end of the rod 15 is threaded as seen at numeral 25 and a flanged member 26 is threadably engaged therewith. By rotating the flanged member on the threads 25, a portion of the flanged member is drawn against the C-shaped clamp and securement is effected. It is to be understood that the support member 23 may be vertically disposed or horizontally disposed whereby the cooking apparatus 10 can be suitably supported in a cantilevered position.

It can also be seen in FIG. 2 that the supply of fuel is carried in a pressurized vessel 26 for holding a sufficient quantity of gas. Therefore, the cooking apparatus of the present invention has all of the great features of conventional charcoal versions but adds the convenience of instant gas cooking. The canister or cylinder 26 is refillable or disposable as desired and adapts to existing LPG and CNG systems. The cylinder 26 includes a pressure head 27 for dispensing gas into the tube 17 via manual controls 28 that may be readily set at the convenience of the user. A quick disconnect arrangement indicated in general by the numeral 30 releasably couples the cylinder 26 to the end of gas tube 17 and a shield 31 covers a release mechanism for detachably connecting the cylinder to the gas tube.

The fire bowl 11 includes an internal cavity which is occupied by a substantially concave liner illustrated in general by numeral 32 that supports a concave screen 33. The screen is covered by a grill 34 taking the form of a circular rod having crosspieces 35 and 36 which support a plurality of rods arranged in fixed parallel, spaced-apart relationship so that the opposite ends of each of the rods is fastened to a portion of the ring 37. The grid or grill 34 is releasably coupled to the edge marginal region of the fire bowl by means of clips 38 and 40 which are carried on opposite sides of the fire bowl and include openings which receive selected rods in the midsection of the grid as will be described later.

FIG. 2 also discloses that the screen 33 holds a plurality of briquettes such as identified by numeral 41 which may be used to enhance the heating effect of the gas burner. The number of briquettes depends on the user and the manner of cooking. The lid 12 in addition to the flange 21 includes a central plate 42 which is provided with a plurality of holes so that venting is accomplished when the lid is used to cover the fire bowl and the grill as shown in FIG. 1.

Referring now in detail to FIG. 3, an exploded view is illustrated of the apparatus where it can be seen that the fire bowl 11 includes a reinforced opening 43 provided in the center of its bottom and an outer ring of openings, such as opening 44 which serve as venting apertures The reinforced opening 43 is used to insertably receive a threaded portion 45 of a base 46. The base 46 includes a circular portion having the bottom of the fire bowl placed on top thereof while the wind deflector or baffle 18 is located on the underside of the anchor or base portion 46. A lower threaded portion (not shown in FIG. 3) extends downwardly from the portion 46 of the base and is attached to a nut coupler 47 carried on the end of tube 17. Inasmuch as the threaded connection portions 45 and the lower portion (not shown in FIG. 3) are tubular, gas flow will pass from the tube 17 through the base into a burner portion indicated by numeral 50. The burner 50 is of conventional design including a plurality of apertures for releasing gas for ignition However, the burner does include an eyelet 51 intended to project through a central opening or hole 52 in the reinforced center of screen 33. Once so disposed, a retaining clip 53 is inserted through the eyelet for retention purposes.

FIG. 3 also discloses that the liner 32 is of similar shape and construction to the fire bowl 11; however, the liner includes a plurality of openings, such as opening 54, that are in spaced-apart relationship with respect to a central opening 55. The openings 54 are vent holes while the central opening 55 is intended to be coaxially disposed with respect to the opening 43 on the fire bowl so as to insertably receive the upper threaded portion 45 of the base 46.

Also, it can be seen that the upper edge of the liner includes the clips 38 and 40 and that the center rod identified by numeral 56 of the grill 34 is longer than the other rods so as to outwardly project beyond the perimeter of the ring. The projecting opposite ends of the rod are intended to fit into the retainers 38 and 40 in order to hold the grill in position so that it will not slide or inadvertently move during the cooking procedure.

It is to be noted that the wind deflector or baffle 18 includes a central portion which is dome shaped and indicated in general by the numeral 57. The outer periphery of the deflector includes an upturned lip identified by numeral 58. Therefore, the deflector is substantially dish shaped with a high inner crown or dome. The center portion of the deflector is similar to the screen 33, liner 32, and bowl 11 in that the center opening is reinforced in thickness so that ready support on the base 46 can be attained.

Referring now in detail to FIG. 4, it can be seen that all of the components of the barbecue cooking apparatus 10 are coaxially related and that all the components are substantially mounted on the base 46 which is held on angle member 58 carried on the brace 14. The base 46 includes the upper threaded portion 45 which mounts the bowl 11, and the inner liner 32. It is to be particularly noted that the burner 50 includes a lower plate having a threaded aperture indicated broadly by the numeral 61 which threadably engages with the threaded upper portion 45. By this means, the burner 50 is rotated and presses the liner downward into engagement with the reinforced central section of the bowl 11. Thus, assembly is achieved. The screen is retained by insertion of the hole over the eyelet 51 so that the clip 53 can be installed.

The bottom or underside of the bowl 11 is conical shaped in order to conform and mate with the dome shape 57 of the deflector 18. Such an arrangement ensures that a certain amount of space will be available for airflow through the vents 44 between the underside of the bowl and the outer lip 58 of the deflector.

By employing the liner which is of substantial conformal configuration to the configuration of the bowl 11, the bowl will never receive any of the debris, ash, or food substances that would normally occur in a barbecue situation. The liner 32 serves to catch such ingredients should any pass through the screen 33. Therefore, the liner device is very convenient and clean.

Referring now in detail to FIG. 5 and the gas supply portion of FIG. 4, it can be seen that a simple pin attachment and release mechanism are provided for attaching the control head 27 of the fuel supply to the tube 17. In FIG. 4, a nozzle 63 is provided with a reduced groove 64 so that when inserted into a receiver 65, the groove 64 will be open through a notch 66. Such a circumstance is shown in FIG. 5, and, in this view, a pin 67 is positioned through the opening 66 and through the groove 64 for releasable retention purposes. A cover 31 may be pulled back as shown in FIG. 4 during the installing or removing of pin 67. However, during the operation of the gas system, the cover 31 is disposed over the entire connection so that the pin cannot be advertently displaced. The cover 31 is manually removed and includes a forward stop indicated by numeral 68 and a rear back-up ring 70.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A barbecue apparatus adapted to be cantilevered outwardly from a support comprising:
    a flanged base;
    a support member;
    an elongated rod;
    a brace, anchoring said base with said support member via said rod so that said base is cantilevered outwardly laterally with respect to said support member;
    a circular walled bowl carried on said base having vent apertures and a peripheral edge marginal region;
    a grease screen carried on said walled bowl;
    a gas burner mounted on a selected end of said base supporting said apertured liner thereon;
    a cooking grill removably carried on said peripheral edge marginal region;
    a detachable coupler joining said burner to said base;
    a source of pressurized gas including controls therefor;
    a hollow feeder tube interconnecting said gas source to said burner;
    a vented lid including a retention member engageable with said edge marginal region of said bowl for shielding said grill from wind;
    a baffle carried on said base immediately adjacent to said walled bowl in fixed spaced-apart relationship defining a limited annular passageway therebetween; and
    said baffle constituting a wind deflector to limit wind gusts via said passageway from entering said walled bow via said vent openings.

* * * * *